US011878522B2

(12) United States Patent
Cho et al.

(10) Patent No.: US 11,878,522 B2
(45) Date of Patent: Jan. 23, 2024

(54) INKJET PRINTING APPARATUS

(71) Applicant: Samsung Display Co., LTD., Yongin-si (KR)

(72) Inventors: Byeong Hoon Cho, Seoul (KR); Jong Hyuk Kang, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 64 days.

(21) Appl. No.: 17/751,076

(22) Filed: May 23, 2022

(65) Prior Publication Data

US 2022/0388303 A1 Dec. 8, 2022

(30) Foreign Application Priority Data

Jun. 8, 2021 (KR) ........................ 10-2021-0074253

(51) Int. Cl.
*B41J 2/09* (2006.01)
*B41J 2/14* (2006.01)
*B41J 2/045* (2006.01)

(52) U.S. Cl.
CPC ............. *B41J 2/09* (2013.01); *B41J 2/04501* (2013.01); *B41J 2/14* (2013.01); *B41J 2002/14491* (2013.01)

(58) Field of Classification Search
CPC ... B41J 2/09; B41J 2/04501; B41J 2/14; B41J 2002/14491; B41J 2002/14403; B41J 2/1433; B41J 2/01; B41J 3/4073; B41J 2/045; B41J 2/04593; B41J 2202/04
See application file for complete search history.

(56) References Cited

U.S. PATENT DOCUMENTS

2003/0016272 A1 1/2003 Anagnostopoulos et al.

OTHER PUBLICATIONS

Machine Translation of EP 3 050 706 A1, Galliker et al., "Multi-nozzle Print Head", Aug. 3, 2016, [Paragraphs 0085 and 0123] (Year: 2016).*

* cited by examiner

*Primary Examiner* — Lisa Solomon
(74) *Attorney, Agent, or Firm* — KILE PARK REED & HOUTTEMAN PLLC

(57) ABSTRACT

An inkjet printing apparatus comprises an inkjet head disposed above a stage and including nozzles through which ink including bipolar elements is discharged, the bipolar elements each having regions partially doped with different polarities. At least part of the nozzles is deflected from a direction in case that the nozzles are in a deflected state.

20 Claims, 13 Drawing Sheets

INKJET PRINTING APPARATUS

CROSS-REFERENCE TO RELATED APPLICATION(S)

This application claims priority to and benefits of Korean Patent Application No. 10-2021-0074253 under 35 U.S.C. § 119, filed on Jun. 8, 2021, in the Korean Intellectual Property Office, the contents of which are incorporated herein by reference.

BACKGROUND

1. Technical Field

The disclosure relates to an inkjet printing apparatus.

2. Description of the Related Art

The importance of display devices has steadily increased with the development of multimedia technology. In response, various types of display devices such as organic light emitting displays (OLEDs), a liquid crystal displays (LCDs) and the like have been used.

A display device is a device for displaying an image, and includes a display panel, such as an organic light emitting display panel or a liquid crystal display panel. The light emitting display panel may include light emitting elements, e.g., light emitting diodes (LEDs). Examples of the light emitting diodes include organic light emitting diodes (OLEDs) using an organic material as a fluorescent material and inorganic light emitting diodes using an inorganic material as a fluorescent material.

Inorganic light emitting diodes that use inorganic semiconductor materials as a fluorescent material may be durable, even in a high temperature environment, and may have higher efficiency for blue light than an organic light emitting diode. In the manufacturing process, transfer methods using a dielectrophoresis (DEP) methods have been developed. Such methods have addressed drawbacks of conventional inorganic light emitting diodes. Accordingly, studies have been continuously conducted on inorganic light emitting diodes that have superior durability and efficiency compared to the organic light emitting diodes.

An inkjet printing apparatus may be used to transfer an inorganic light emitting diode using the dielectrophoresis method or to form an organic material layer included in the display device. After an ink or solution is inkjet-printed, a post-treatment process may be executed to transfer the inorganic light emitting diode element or to form the organic material layer. The inkjet printing apparatus may execute a process of supplying a selected ink or solution to an inkjet head and spraying the ink or the solution onto a selected substrate using the inkjet head.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

Aspects of the disclosure provide an inkjet printing apparatus capable of varying a jetting pitch.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an embodiment, an inkjet printing apparatus may comprise an inkjet head disposed above a stage and including a nozzles through which ink including bipolar elements is discharged. The bipolar elements may each have regions partially doped with different polarities. At least a part of the nozzles may be deflected from a direction in case that the nozzles are in a deflected state.

In an embodiment, the inkjet head may include a base part and an internal tube disposed in the base part and supplied with the ink. The nozzles may be disposed at a lower end of the internal tube. The inkjet head may cause the ink to flow through the internal tube and to be discharged through the nozzles.

In an embodiment, each of the nozzles may include an inlet connected to the internal tube and an outlet through which the ink is discharged.

In an embodiment, each of the nozzles may further include an actuator disposed between the inlet and the outlet.

In an embodiment, the actuator may control an amount of droplets of the ink discharged from each of the nozzles.

In an embodiment, the actuator may be attached to the internal tube.

In an embodiment, each of the nozzles may further include a flexible tube disposed between the actuator and the outlet.

In an embodiment, each of the nozzles may further include a microelectronic controller disposed between the flexible tube and the outlet.

In an embodiment, the microelectronic controller may be connected to at least one microelectronic control wire attached the microelectronic controller.

In an embodiment, in case that the microelectronic controller moves, the flexible tube may be bent in a movement direction in which the microelectronic controller moves.

In an embodiment, the at least one microelectronic control wire may include a plurality of microelectronic control wires. The plurality of microelectronic control wires may include a first microelectronic control wire connected to an end of the microelectronic controller in a first direction, and a second microelectronic control wire connected to another end of the microelectronic controller in the first direction.

In an embodiment, the plurality of microelectronic control wires may further include a third microelectronic control wire connected to an end of the microelectronic controller in a second direction intersecting the first direction and a fourth microelectronic control wire connected to another end of the microelectronic controller in the second direction.

According to an embodiment, an inkjet printing apparatus may comprise a stage; and an inkjet head disposed above the stage and including nozzles through which ink including bipolar elements is discharged. The bipolar elements may each have regions partially doped with different polarities. Sprayed droplets of the ink may have a first pitch in case that the nozzles are in a non-deflected state. The sprayed droplets of the ink may have a second pitch which is different from the first pitch in case that the nozzles are in a deflected state in which at least part of the nozzles are deflected from a direction.

In an embodiment, the nozzles may have the first pitch in the non-deflected state. The nozzles may have the second pitch in the deflected state.

In an embodiment, the at least part of the nozzles may include a microelectronic controller that deflects the at least part of the nozzles from the direction.

In an embodiment, the microelectronic controller may be connected to at least one microelectronic control wire attached to the microelectronic controller.

In an embodiment, the inkjet head may be moveable in a vertical direction.

In an embodiment, the inkjet head may be moveable in the vertical direction to adjust a pitch on the stage between the ink discharged by the nozzles.

In an embodiment the inkjet head may be capable of being tilted with respect to the stage. The inkjet head may be tilted to adjust a pitch on the stage between the ink discharged by the nozzles.

According to an embodiment, the inkjet head may include a base part and an internal tube disposed in the base part and supplied with the ink. The nozzles may be disposed at a lower end of the internal tube. The inkjet head may cause the ink to flow through the internal tube and to be discharged through the nozzles.

The effects of the disclosure are not limited to the aforementioned effects, and various other effects are included in the specification.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
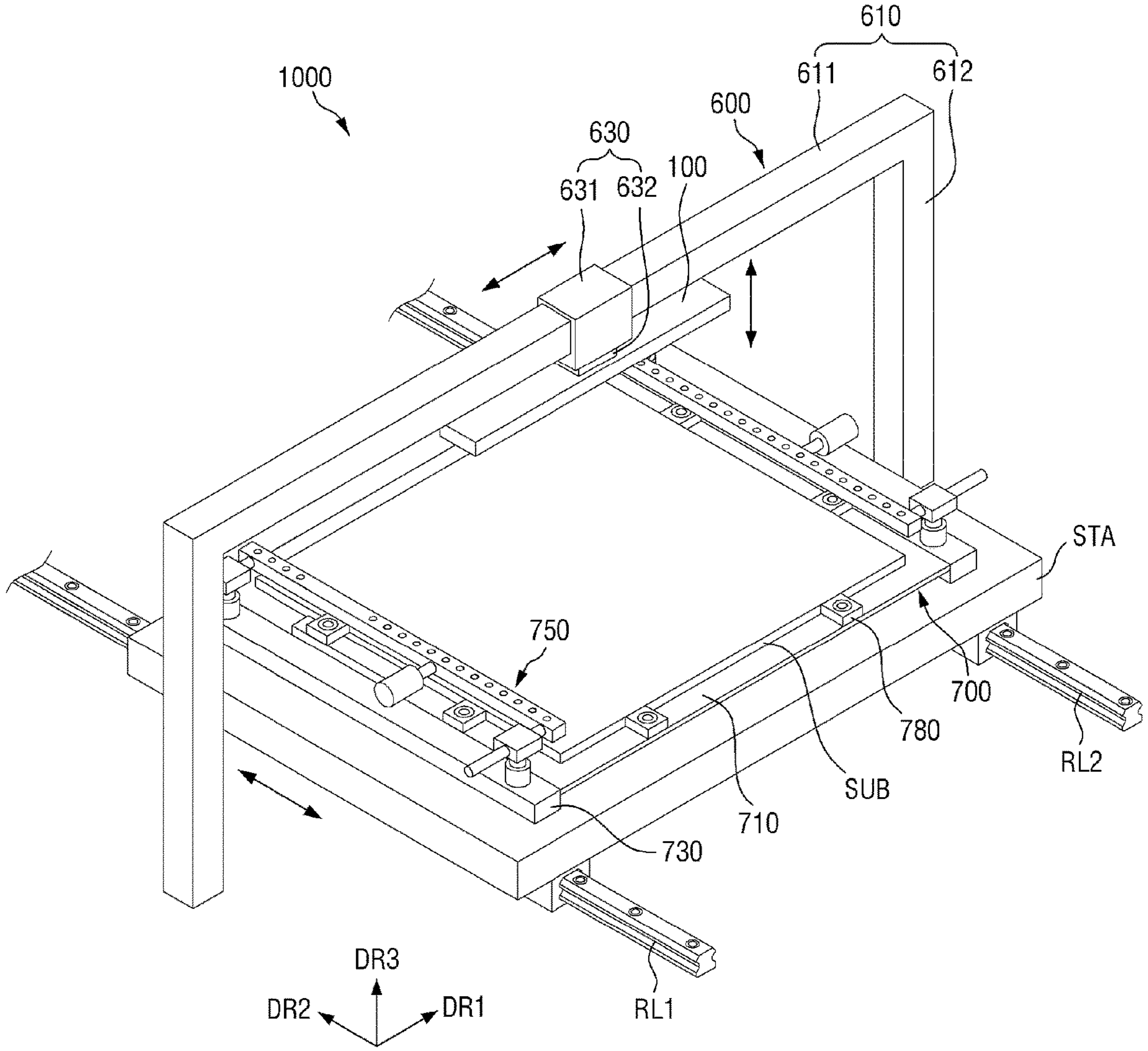
FIG. 1 is a schematic perspective view of an inkjet printing apparatus according to an embodiment.

Structural and functional descriptions of embodiments disclosed herein with reference to the accompanying drawings. The disclosure may be embodied in different forms and should not be construed as limited to the embodiments set forth herein. Rather, these embodiments are provided so that this disclosure will be thorough and complete, and will fully convey the scope of the disclosure to those skilled in the art. Therefore, the embodiments are disclosed only for illustrative purposes and should not be construed as limiting the disclosure. Accordingly, the scope of the disclosure is defined by the claims.

It will be understood that when an element is referred to as being related to another element such as being "coupled" or "connected" to another element, it can be directly coupled or connected to the other element or intervening elements may be present therebetween. In contrast, it should be understood that when an element is referred to as being related to another element such as being "directly coupled" or "directly connected" to another element, there are no intervening elements present. Other expressions that explain the relationship between elements, such as "between," "directly between," "adjacent to," or "directly adjacent to," should be construed in the same way.

Throughout the specification, the same reference numerals will refer to the same or like parts.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

In the specification and the claims, the phrase "at least one of" is intended to include the meaning of "at least one selected from the group of" for the purpose of its meaning and interpretation. For example, "at least one of A and B" may be understood to mean "A, B, or A and B."

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments will be described with reference to the attached drawings.

Figure 2:
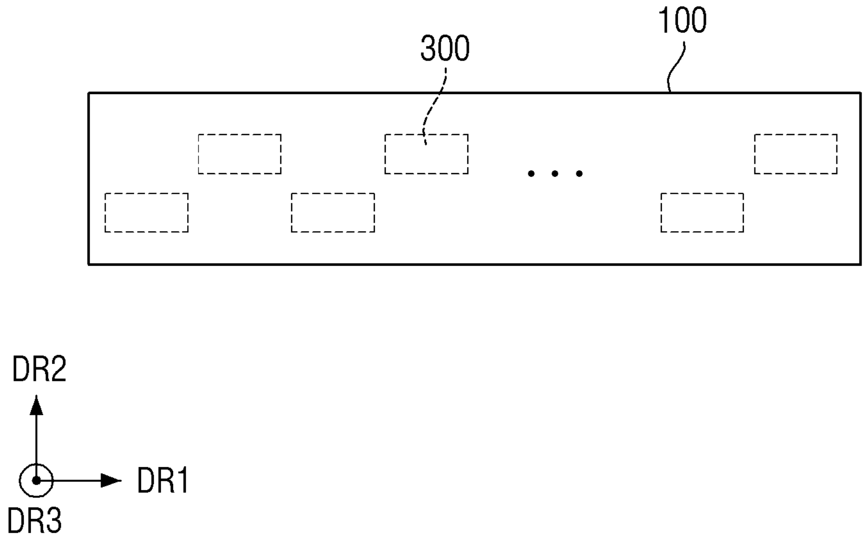
FIG. 2 is a schematic plan view of a print head unit according to an embodiment.
Figure 3:
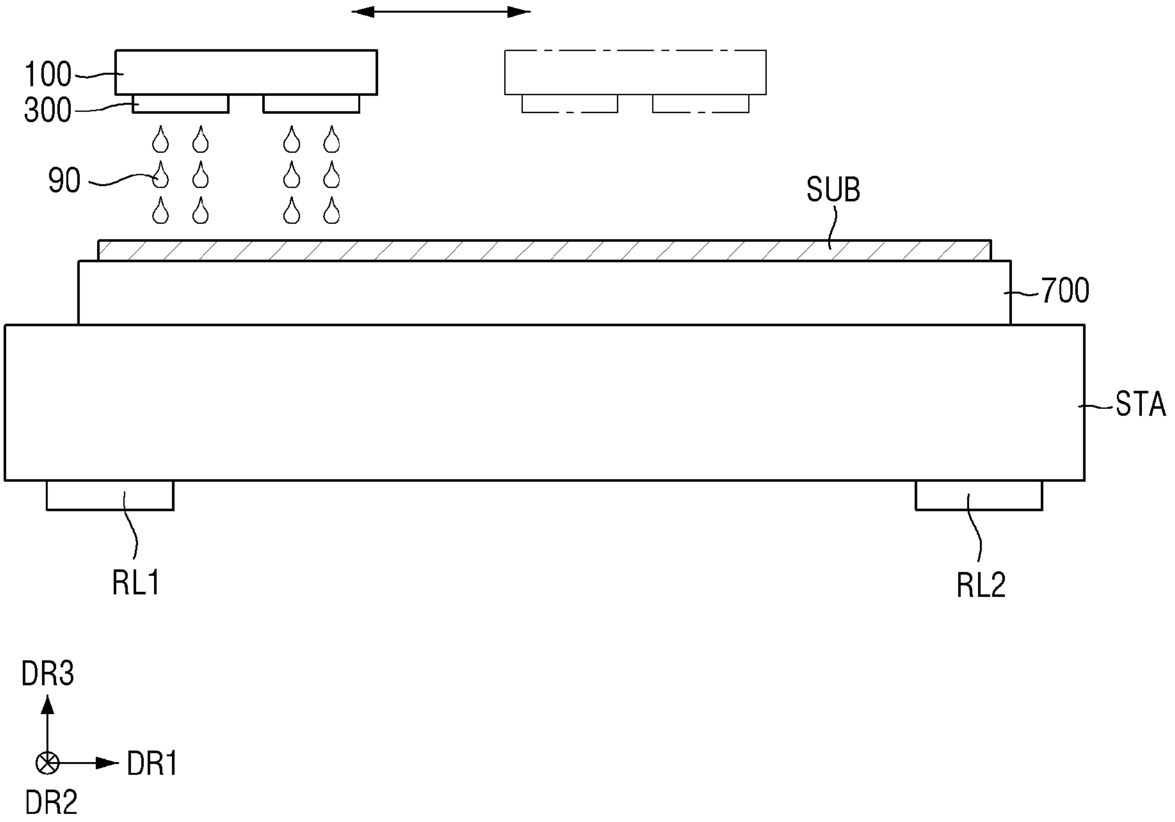
FIG. 3 is a schematic view illustrating an operation of a print head unit according to an embodiment.

FIG. 1 is a schematic perspective view of an inkjet printing apparatus according to an embodiment. FIG. 2 is a schematic plan view of a print head unit according to an embodiment. FIG. 3 is a schematic view illustrating an operation of a print head unit according to an embodiment.

Referring to FIGS. 1 to 3, an inkjet printing apparatus 1000 according to an embodiment may include a print head unit 100 including inkjet heads 300. The inkjet printing apparatus 1000 may further include a stage STA, a probe device 700 and a base frame 600.

A first direction DR1, a second direction DR2, and a third direction DR3 are defined as shown in FIG. 1. The first direction DR1 and the second direction DR2 are located on the same plane and are orthogonal to each other, and the third direction DR3 is a direction perpendicular to the first direction DR1 and the second direction DR2. It may be understood that the first direction DR1 refers to a horizontal direction in the drawings, the second direction DR2 refers to a vertical direction in the drawings, and the third direction DR3 refers to an upward and downward direction in the drawings.

The inkjet printing apparatus 1000 may use the print head unit 100 to spray a selected ink 90 on a target substrate SUB. An electric field may be generated by the probe device 700 on the target substrate SUB onto which the ink 90 has been sprayed, and particles such as bipolar elements included in the ink 90 may be aligned on the target substrate SUB.

The target substrate SUB may be provided on the probe device 700, the probe device 700 may form an electric field on the target substrate SUB, and the electric field may be delivered to the ink 90 sprayed onto the target substrate SUB. Particles such as bipolar elements 95 included in the ink 90 may have a shape extending in a direction and may be aligned such that the extension direction is oriented in a direction by the electric field.

The inkjet printing apparatus 1000 according to an embodiment may include an inkjet head 300. The inkjet head 300 may spray, discharge, or print the ink 90 including the bipolar elements 95 on the target substrate SUB, and the stage STA may provide an area where the probe device 700 is disposed.

The inkjet printing apparatus 1000 includes a first rail RL1 and a second rail RL2 extending in the second direction DR2, and the stage STA is disposed on the first rail RL1 and the second rail RL2. The stage STA may move in the second direction DR2 through a separate moving member on the first rail RL1 and the second rail RL2. The probe device 700 may move together with the stage STA in the second direction DR2, and the ink 90 may be sprayed on the probe device 700 while the probe device 700 passes by the print head unit 100. However, the disclosure is not limited thereto. Although FIG. 1 illustrates a structure in which the stage STA moves, in some embodiments, the stage STA may be fixed and the print head unit 100 may move. The print head unit 100 may be mounted on a frame disposed on the first rail RL1 and the second rail RL2.

The print head unit 100 may be disposed in the base frame 600 including the inkjet heads 300. The print head unit 100 may spray the selected ink 90 onto the target substrate SUB provided in the probe device 700 by using the inkjet head 300 connected to a separate ink storage.

The base frame 600 may include a support unit 610 and a moving unit 630. The support unit 610 may include a first support part 611 extending in the first direction DR1 which is the horizontal direction and a second support part 612 connected to the first support part 611 and extending in the third direction DR3 which is the vertical direction. The extension direction of the first support part 611 may be the same as the first direction DR1 which is a long side direction of the probe device 700. The print head unit 100 may be disposed on the moving unit 630 mounted on the first support part 611.

The moving unit 630 may include a moving part 631 mounted on the first support part 611 and movable in one direction and a fixing part 632 disposed on the bottom surface of the moving part 631 to place the print head unit 100. The moving part 631 may move on the first support part 611 in the first direction DR1 and the print head unit 100 may be fixed on the fixing part 632 to move together with the moving part 631 in the first direction DR1.

The print head unit 100 may be disposed on the base frame 600, and spray the ink 90 provided from an ink reservoir onto the target substrate SUB through the inkjet heads 300. The print head unit 100 may be spaced apart from the stage STA that passes below the base frame 600 by a selected distance. The distance between the print head unit 100 and the stage STA may be adjusted by a height of the second support part 612 of the base frame 600. The separation distance between the print head unit 100 and the stage STA may be adjusted within a range in which a space required for the printing process can be secured due to a certain distance between the print head unit 100 and the target substrate SUB when the probe device 700 and the target substrate SUB are disposed on the stage STA.

According to an embodiment, the print head unit 100 may include the inkjet head 300 including nozzles 350. The inkjet head 300 may be disposed on the bottom surface of the print head unit 100. The inkjet head 300 may be disposed above the stage STA.

The inkjet heads 300 may be disposed to be spaced apart from each other in a direction and may be arranged in a single row or in multiple rows. FIGS. 2 and 3 illustrate a case in which the inkjet heads 300 are arranged in two rows and the inkjet heads 300 of each row are alternately arranged. However, the disclosure is not limited thereto, and the inkjet heads 300 may be arranged in a larger number of rows and may be arranged to overlap each other without crossing each other. The shape of the inkjet head 300 is not particularly limited, but for example, the inkjet head 300 may have a quadrilateral shape.

At least one inkjet head 300, for example, two inkjet heads 300, may be disposed adjacent to each other form a single pack. However, the number of inkjet heads 300 included in a single pack is not limited thereto, and for example, the number of inkjet heads 300 included in a single pack may be in a range of 1 to 5. Also, although FIG. 2 illustrates six inkjet heads 300 disposed in the print head unit 100, this is to schematically illustrate the print head unit 100, and the number of inkjet heads 300 is not limited thereto.

The inkjet heads 300 disposed in the print head unit 100 may spray the ink 90 onto the target substrate SUB disposed above the stage STA. According to an embodiment, the print head unit 100 may move on the first support part 611 in one direction, and the inkjet heads 300 may move in the one direction to spray the ink 90 onto the target substrate SUB.

The print head unit 100 may move in the first direction DR1 in which the first support part 611 extends, and the inkjet heads 300 may move in the first direction DR1 to spray the ink 90 onto the target substrate SUB.

In an embodiment, the ink 90 may include a solvent 91 and the bipolar elements 95 included in the solvent 91. In an embodiment, the ink 90 may be provided in a form of a solution or a colloidal state. For example, the solvent 91 may be acetone, water, alcohol, toluene, propylene glycol (PG), propylene glycol methyl acetate (PGMA) or the like, but is not limited thereto. The bipolar elements 95 may be included in a dispersed state in the solvent 91 and may be supplied to the print head unit 100 so as to be discharged.

In some embodiments, a width of the target substrate SUB measured in the first direction DR1 may be greater than a width of the print head unit 100. The print head unit 100 may move in the first direction DR1 and spray the ink 90 over the entire surface of the target substrate SUB. If the target substrates SUB are provided on the probe device 700, the print head unit 100 may spray the ink 90 onto each of the target substrates SUB while moving in the first direction DR1.

However, the disclosure is not limited thereto, and the print head unit 100 may be positioned (or disposed) outside the first rail RL1 and the second rail RL2, and then move in the first direction DR1 to spray the ink 90 onto the upper portion of the target substrate SUB. When the stage STA moves in the second direction DR2 and is positioned below the base frame 600, the print head unit 100 may move between the first rail RL1 and the second rail RL2 to spray the ink 90 through the inkjet heads 300. The operation of the inkjet heads 300 is not limited thereto and may be modified in various ways within a range in which a similar process can be implemented.

Figure 4:
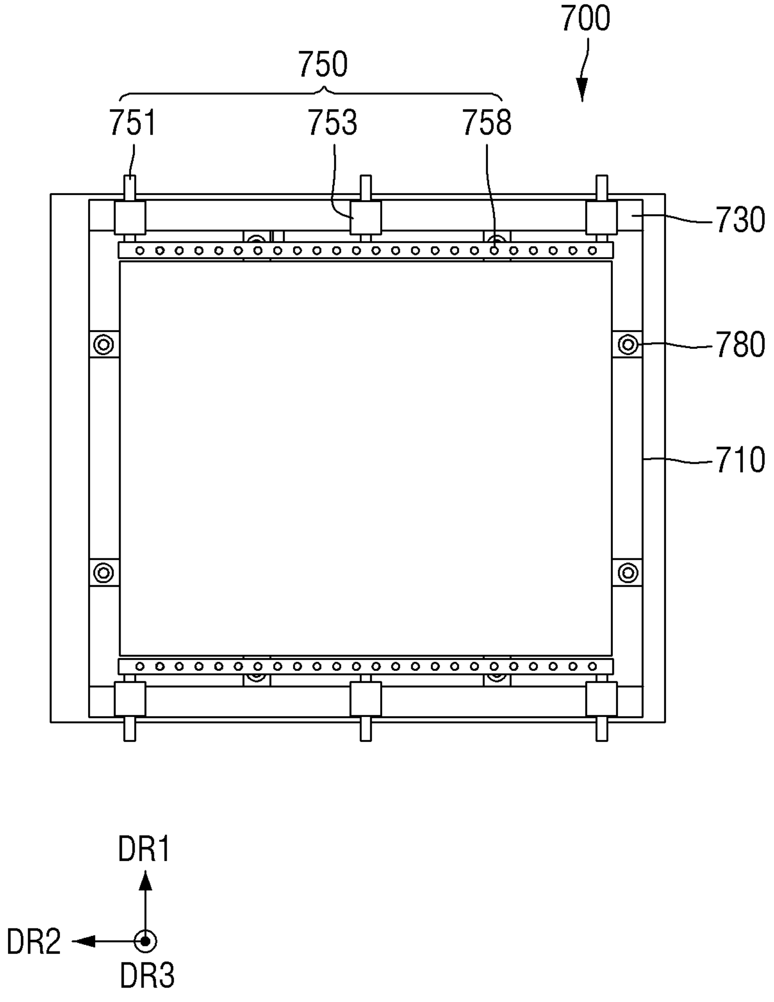
FIG. 4 is a schematic plan view of a probe device according to an embodiment.

FIG. 4 is a schematic plan view of a probe device according to an embodiment.

Referring to FIGS. 1 to 4, the probe device 700 may include a sub-stage 710, a probe support 730, a probe unit 750 and an aligner 780.

The probe device 700 may be disposed on the stage STA and move together with the stage STA in the second direction DR2. The probe device 700 on which the target substrate SUB is disposed may move along the stage STA and the ink 90 may be sprayed thereon. When the ink 90 is sprayed, the probe device 700 may generate an electric field on the target substrate SUB. However, the disclosure is not limited thereto. In some embodiments, the stage STA may not move and the print head unit 100 may move along the second direction DR2 to spray the ink 90 onto the stage STA.

The sub-stage 710 may provide a space where the target substrate SUB is disposed. The probe support 730, the probe unit 750 and the aligner 780 may be disposed on the sub-stage 710. The shape of the sub-stage 710 is not particularly limited, but for example, as illustrated in the drawing, the sub-stage 710 may have a quadrilateral shape with both sides extending in the first direction DR1 and the second direction DR2. The sub-stage 710 may include long sides extending in the first direction DR1 and short sides extending in the second direction DR2. However, the overall planar shape of the sub-stage 710 may vary depending on the planar shape of the target substrate SUB. For example, when the target substrate SUB is rectangular in a plan view, the shape of the sub-stage 710 may be rectangular as illustrated in the drawing, and when the target substrate SUB has a circular planar shape, the sub-stage 710 may also have a circular shape in a plan view.

At least one aligner 780 may be disposed on the sub-stage 710. The aligner 780 may be disposed on each side of the sub-stage 710 and an area surrounded by the aligners 780 may be the area in which the target substrate SUB is disposed. In the drawing, two aligners 780 are disposed to be spaced apart on each side of the sub-stage 710 and eight aligners 780 are disposed on the sub-stage 710. However, the disclosure is not limited thereto, and the number and arrangement of the aligners 780 may vary depending on the shape or type of the target substrate SUB.

The probe support 730 and the probe unit 750 are disposed on the sub-stage 710. The probe support 730 may provide a space in which the probe unit 750 is disposed on the sub-stage 710. The probe support 730 may be disposed on at least one side of the sub-stage 710 and extend along the direction in which the one side extends. For example, as illustrated in the drawing, the probe support 730 may be disposed to extend in the second direction DR2 on the left and right sides of the sub-stage 710. However, the disclosure is not limited thereto, and the probe support 730 may be included in larger number and, in some cases, may also be disposed on the upper and lower sides of the sub-stage 710. The structure of the probe support 730 may vary depending on the number, arrangement, or structure of probe units 750 included in the probe device 700.

The probe unit 750 may be disposed on the probe support 730 to form an electric field on the target substrate SUB prepared on the sub-stage 710. Like the probe support 730, the probe unit 750 may extend in one direction, for example, the second direction DR2, and the extension length may cover the entire target substrate SUB. The size and shape of the probe support 730 and the probe unit 750 may vary depending on the target substrate SUB.

In an embodiment, the probe unit 750 may include a probe driver 753 disposed on the probe support 730, a probe jig 751 disposed on the probe driver 753 to receive an electrical signal, and a probe pad 758 connected to the probe jig 751 to transmit the electrical signal to the target substrate SUB.

The probe driver 753 may be disposed on the probe support 730 to move the probe jig 751 and the probe pad 758. In an embodiment, the probe driver 753 may move the probe jig 751 in a horizontal direction and a vertical direction, for example, the first direction DR1 which is the horizontal direction and the third direction DR3 which is the vertical direction. The probe pad 758 may be connected to or be separated from the target substrate SUB by driving the probe driver 753. During the process using the inkjet printing apparatus 1000, the probe driver 753 may be driven to connect the probe pad 758 to the target substrate SUB in the step of forming an electric field in the target substrate SUB and the probe driver 753 may be driven again to separate the probe pad 758 from the target substrate SUB in other steps. A detailed description thereof will be given later with reference to other drawings.

The probe pad 758 may form an electric field on the target substrate SUB through an electrical signal transmitted from the probe jig 751. The probe pad 758 may be connected to the target substrate SUB and transmit the electrical signal to form an electric field on the target substrate SUB. For example, the probe pad 758 may be in contact with an electrode or a power pad of the target substrate SUB and an electrical signal of the probe jig 751 may be transmitted to the electrode or the power pad. The electrical signal transmitted to the target substrate SUB may form an electric field on the target substrate SUB.

However, the disclosure is not limited thereto. The probe pad 758 may be a member that forms an electric field through an electrical signal transmitted from the probe jig 751. When forming an electric field by receiving the electrical signal from the probe pad 758, the probe pad 758 may not be connected to the target substrate SUB.

The shape of the probe pad 758 is not particularly limited, but in an embodiment, the probe pad 758 may have a shape extending in a direction and may cover the entire target substrate SUB.

The probe jig 751 may be connected to the probe pad 758 and be connected to a separate voltage applying device. The probe jig 751 may transmit an electrical signal transmitted from the voltage applying device to the probe pad 758 to form an electric field on the target substrate SUB. The electrical signal transmitted to the probe jig 751 may be a voltage for forming an electric field, for example, an alternating current voltage.

The probe unit 750 may include a probe jigs 751 and the number thereof is not particularly limited thereto. Although the drawing illustrates that three probe jigs 751 and three probe drivers 753 are disposed, the probe unit 750 may include more probe jigs 751 and probe drivers 753 to form an electric field having a higher density on the target substrate SUB.

The probe unit 750 according to an embodiment is not limited thereto. Although the drawing illustrates that the probe unit 750 is disposed on the probe support 730, the probe device 700, the probe unit 750 may be disposed as a separate devices in other examples. As long as the probe device 700 includes a device capable of forming an electric field to form the electric field on the target substrate SUB, the structure or arrangement thereof is not limited.

Figure 5:
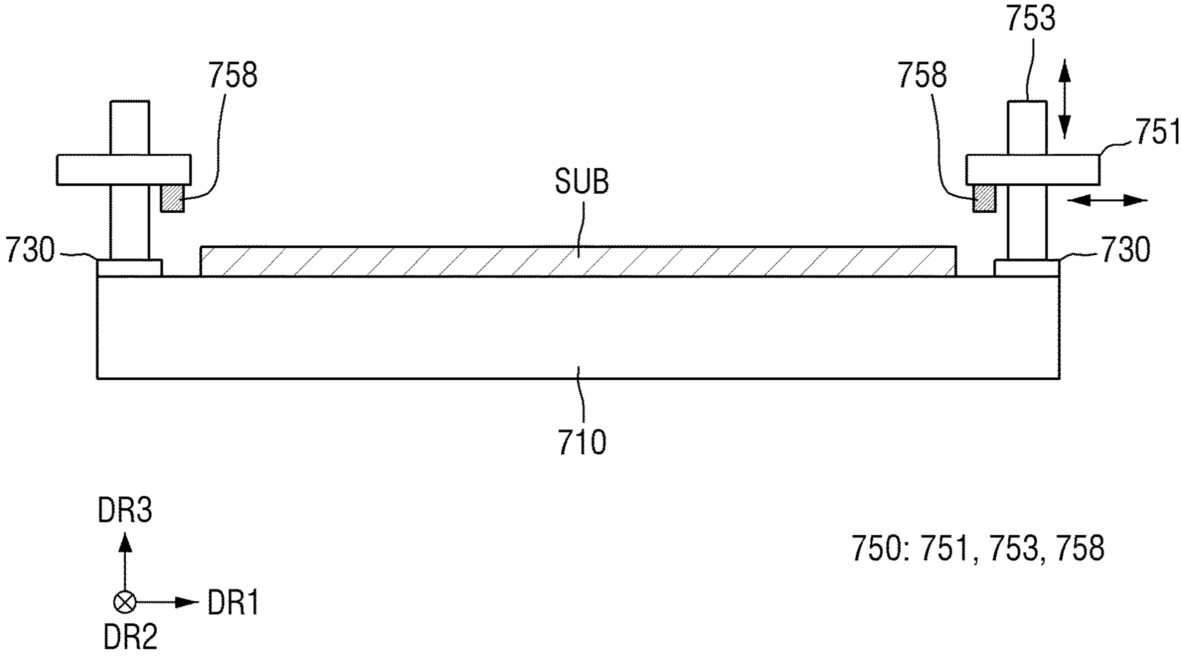
FIGS. 5 and 6 are schematic views illustrating an operation of a probe unit according to an embodiment.
Figure 6:
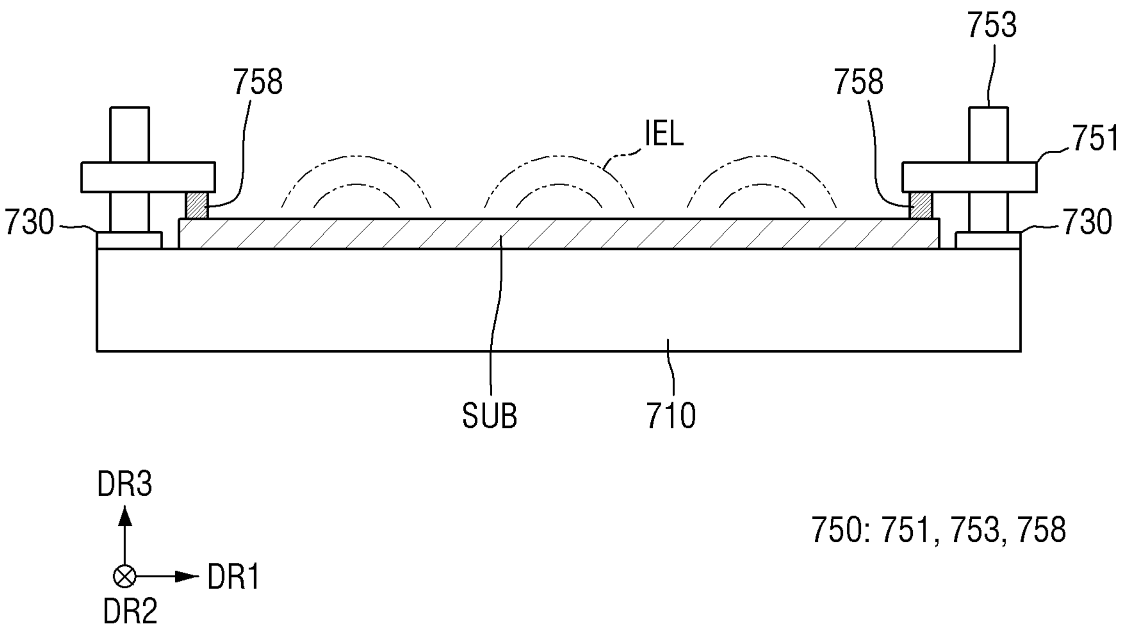

FIGS. 5 and 6 are schematic views illustrating an operation of a probe unit according to an embodiment.

As described above, the probe driver 753 of the probe unit 750 may be operated according to the process steps of the inkjet printing apparatus 1000. Referring to FIGS. 5 and 6, in a first state in which no electric field is formed in the probe device 700, the probe unit 750 may be disposed on the probe support 730 to be spaced apart from the target substrate SUB. The probe driver 753 of the probe unit 750 may separate the probe pad 758 from the target substrate SUB by driving in the first direction DR1 which is the horizontal direction and the third direction DR3 which is the vertical direction.

In a second state in which an electric field is formed on the target substrate SUB, the probe driver 753 of the probe unit 750 may be driven to connect the probe pad 758 to the target substrate SUB. The probe driver 753 may be driven in the third direction DR3 which is the vertical direction and the first direction DR1 which is the horizontal direction so that the probe pad 758 may contact the target substrate SUB. The probe jig 751 of the probe unit 750 may transmit an electrical signal to the probe pad 758 and an electric field may be formed on the target substrate SUB.

It is illustrated in the drawing that a probe unit 750 is disposed on each of the sides of the probe device 700 and two probe units 750 are simultaneously connected to the target substrate SUB. However, the disclosure is not limited thereto, and each of the probe units 750 may be driven separately. For example, when the target substrate SUB is prepared on the sub-stage 710 and the ink 90 is sprayed thereon, any first probe unit 750 may first form an electric field on the target substrate SUB and a second probe unit 750 may not be connected to the target substrate SUB. Thereafter, the first probe unit 750 may be separated from the target substrate SUB and the second probe unit 750 may be connected to the target substrate SUB to form an electric field. The probe units 750 may be driven simultaneously to form an electric field or driven sequentially to sequentially form an electric field.

Figure 7:
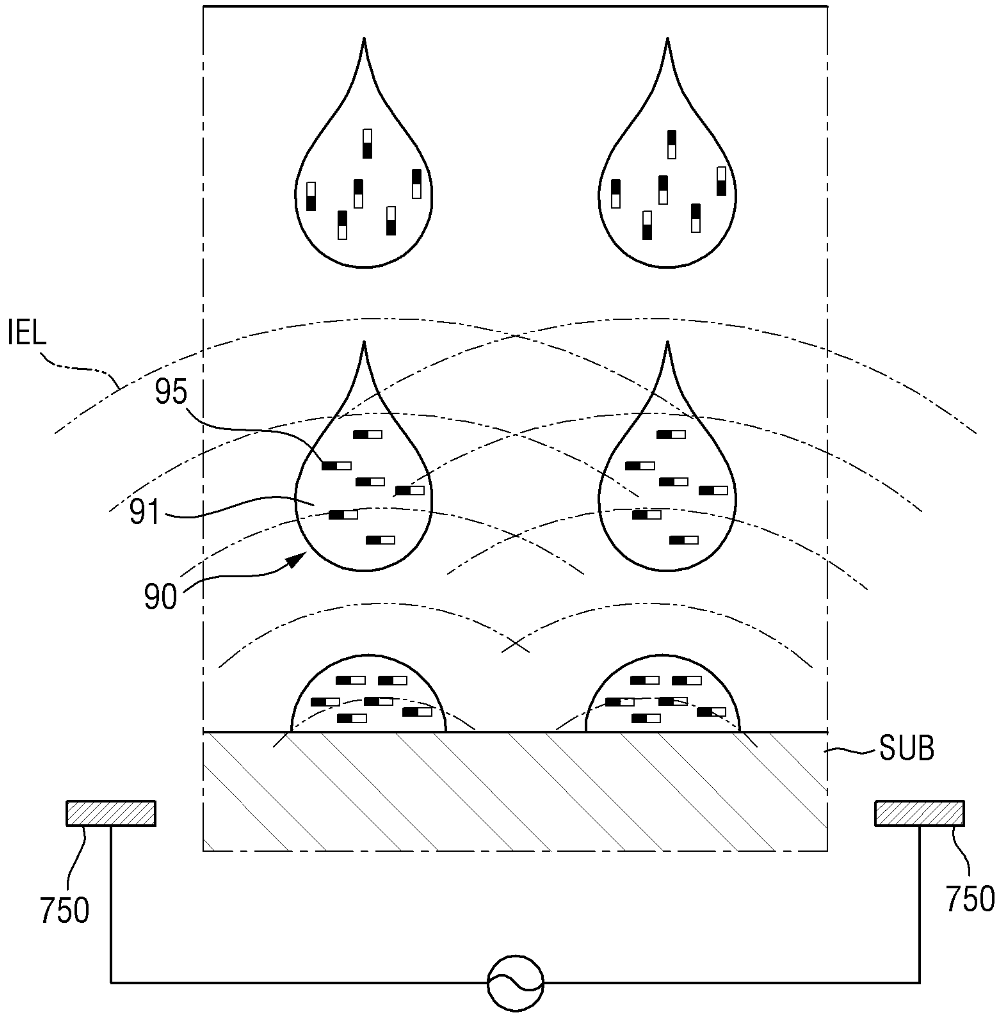
FIG. 7 is a schematic view illustrating an electric field generated on a target substrate by a probe device according to an embodiment.

FIG. 7 is a schematic view illustrating an electric field generated on a target substrate by a probe device according to an embodiment.

Referring to FIG. 7, as described above, the bipolar element 95 may include a first end and a second end having a polarity and, may be subject to a dielectrophoretic force when placed in an electric field, so that its position or orientation direction may be changed. The bipolar elements 95 in the ink 90 sprayed on to the target substrate SUB may be mounted on the target substrate SUB as the position and the orientation direction thereof change due to an electric field IEL generated by the probe device 700.

The probe device 700 may generate the electric field IEL above the target substrate SUB and the ink 90 discharged from the nozzle 350 of the inkjet head 300 may pass through the electric field IEL to be sprayed onto the target substrate SUB. The bipolar element 95 may be subject to a dielectrophoretic force from the electric field IEL until the ink 90 reaches the target substrate SUB, or after the ink reaches the target substrate SUB. According to an embodiment, after being discharged from the inkjet head 300, the orientation direction and the position of the bipolar element 95 may change due to the electric field IEL generated by the probe device 700.

The electric field IEL generated by the probe device 700 may be formed in a direction parallel to the top surface of the target substrate SUB. The bipolar element 95 sprayed on to the target substrate SUB may be oriented by the electric field IEL such that the extension direction of its major axis is parallel to the top surface of the target substrate SUB. Also, the bipolar elements 95 may be mounted on the target substrate SUB with the first end having a polarity oriented in a specific direction.

When the bipolar elements 95 are mounted on the target substrate SUB, the alignment degree may measure the deviation of the orientation direction of the bipolar elements 95, or the deviation in the mounted positions on the target substrate SUB. In the bipolar elements 95 mounted on the target substrate SUB, the deviation in the orientation direction and in the mounted positions of other bipolar elements 95 with respect to a selected bipolar element 95 may be measured, thereby measuring the alignment degree of the bipolar elements 95. The "alignment degree" of the bipolar elements 95 may refer to the deviations in the orientation direction and in the mounted positions of the bipolar elements 95 aligned on the target substrate SUB. For example, a low alignment degree of the bipolar elements 95 may refer to the bipolar elements 95 having large deviations in the orientation direction and in the mounted positions. A high, or improved, alignment degree of the bipolar elements 95 may refer to the bipolar elements 95 having small deviations in the orientation direction and in the mounted positions.

The timing at which the probe device 700 generates the electric field IEL above the target substrate SUB is not particularly limited. The drawing illustrates a case in which the electric field IEL is generated in the probe unit 750 while the ink 90 is being discharged from the nozzle 350 to reach the target substrate SUB. Accordingly, the bipolar element 95 may be subject to a dielectrophoretic force due to the electric field IEL until the ink 90 is discharged from the nozzle 350 to reach the target substrate SUB. However, the disclosure is not limited thereto, and in other examples, the probe unit 750 may generate the electric field IEL after the ink 90 has reached the target substrate SUB. When the ink 90 is sprayed from the inkjet head 300 or thereafter, the probe device 700 may generate the electric field IEL.

Although not illustrated in the drawing, in some embodiments, an electric field generating member may further be disposed on the sub-stage 710. Like the probe unit 750 to be described later, the electric field generating member may form an electric field in an upward direction (i.e., the third direction DR3) or above the target substrate SUB. In an embodiment, an antenna unit or a device including a electrodes may be applied as the electric field generating member.

Although not illustrated in the drawing, the inkjet printing apparatus 1000 according to an embodiment may further include a heat treatment unit which volatizes the ink 90 sprayed on the target substrate SUB. The heat treatment unit may irradiate heat to the ink 90 sprayed onto the target substrate SUB so that the solvent 91 of the ink 90 is volatilize and removed, and the bipolar element 95 may be disposed on the target substrate SUB. The process of removing the solvent 91 by irradiating heat to the ink 90 may be performed by using a heat treatment unit.

Figure 8:
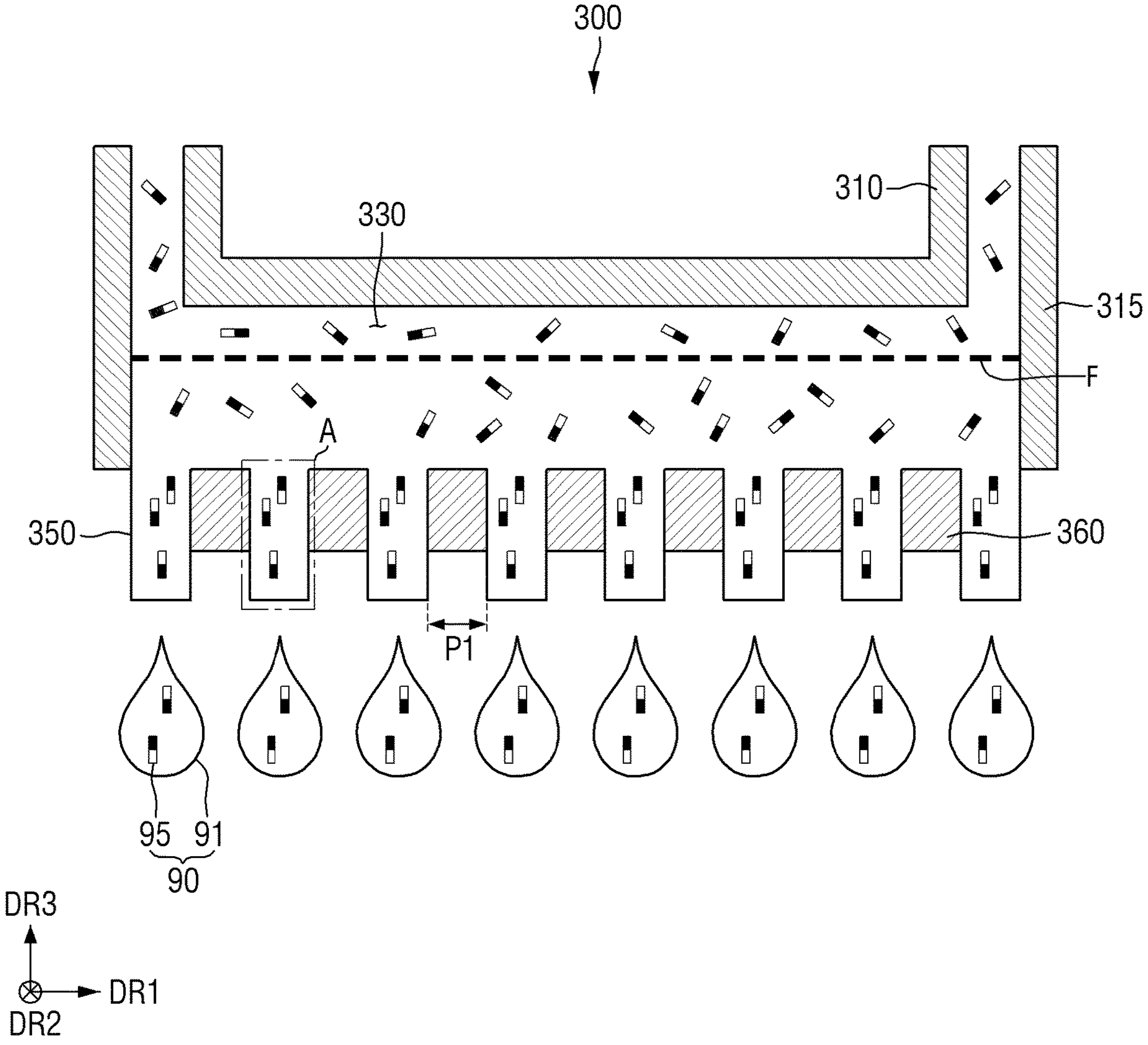
FIG. 8 is a schematic cross-sectional view of an inkjet head according to an embodiment.

FIG. 8 is a schematic cross-sectional view of an inkjet head according to an embodiment. FIG. 8 illustrates nozzles 350 that are not deflected (in a non-deflected state).

Referring to FIG. 8, the inkjet head 300 may include the nozzles 350 to discharge the ink 90 through the nozzles 350. The ink 90 discharged from the nozzles 350 may be sprayed onto the target substrate SUB provided on the stage STA or the probe device 700. The nozzles 350 may be positioned on the bottom surface of the inkjet head 300 and may be arranged along a direction in which the inkjet head 300 extends.

The inkjet head 300 may include a base part 310, an internal tube 330, and the nozzles 350.

The base part 310 may constitute a main body of the inkjet head 300. The base part 310 may be attached to the print head unit 100. As described above with reference to FIG. 2, the base part 310 may have a shape extending in the first direction DR1 and the second direction DR2. However, the disclosure is not limited thereto, and the base part 310 may have a circular shape.

The internal tube 330 may be disposed in the base part 310 to be connected to an internal flow path of the print head unit 100, and the ink 90 may be supplied from an ink circulation unit 500.

The inkjet head 300 may include a filter F disposed in the internal tube 330. When the ink 90 flowing along the internal tube 330 enters the nozzle 350, the filter F may prevent materials other than the bipolar element 95 from entering the nozzle 350. Accordingly, the filter F may prevent the nozzle 350 from being clogged due to foreign matter or may prevent foreign matter from being mixed with the ink 90 discharged from the nozzle 350.

The base part 310 may have a shape extending in one direction and the internal tube 330 may be formed along the extension direction of the base part 310. The internal tube 330 may be located in the base part 310 in cross-sectional view. The ink 90 supplied through the print head unit 100 may flow through the internal tube 330 and be discharged through the nozzles 350 of the inkjet head 300. The inkjet head 300 may cause the ink to flow through the internal tube and to be discharged though the nozzles 350

The nozzles 350 may be connected to the internal tube 330. The nozzles 350 may be connected to the lower end of the internal tube 330. The nozzles 350 may be arranged along the first direction DR1. Although not illustrated in the drawing, the nozzles 350 may be arranged in a single row or in multiple rows. Although FIG. 8 illustrates eight nozzles 350 that are formed in the inkjet head 300, the disclosure is not limited thereto. In some embodiments, the number of nozzles 350 included in the inkjet head 300 may be in a range of 128 to 1800. The nozzles 350 may discharge the ink 90 that introduced along the internal tube 330. The amount of the ink 90 sprayed through the nozzles 350 may be adjusted according to a voltage applied to each nozzle 350. In an embodiment, the amount of the ink 90 discharged once from each nozzle 350 may be in a range of about 1 to about 50 pico-liters (pL), but the disclosure is not limited thereto.

The nozzles 350 may have a selected pitch along the first direction DR1. For example, the nozzles 350 may be arranged to have a first pitch P1 along the first direction DR1. For example, the nozzles 350 may all be arranged to have the first pitch P1. The ink 90 discharged from the nozzles 350 all arranged to have the first pitch P1 may be sprayed onto the target substrate SUB of FIG. 1 to have a first target pitch. The first target pitch may differ depending on a separation distance between the nozzles 350 and the target substrate SUB and a deflection angle (degree of tilt) of the nozzles 350. For example, the nozzles 350 according to an embodiment may be deflected simultaneously to one direction. The nozzles 350 may be deflected simultaneously in one direction, thereby adjusting the first target pitch. As the separation distance between the nozzles 350 and the target substrate SUB increases, the first target pitch may decrease or increase according to the deflection angle. As the separation distance between the nozzles 350 and the target substrate SUB decreases, the first target pitch may increase or decrease according to the deflection angle. The nozzles 350 according to an embodiment may be deflected simultaneously in one direction. The nozzles 350 may be deflected simultaneously in one direction, thereby adjusting the first target pitch.

The ink 90 discharged through the nozzles 350 may include the solvent 91 and the bipolar elements 95 dispersed in the solvent 91. According to an embodiment, the bipolar element 95 may have a shape extending in one direction. The bipolar elements 95 may be randomly dispersed in the ink 90, flow along the internal tube 330, and then be supplied to the nozzle 350. Since the bipolar element 95 has a shape extending in one direction, the bipolar element 95 may be oriented in a direction in which the major axis is directed. Also, the bipolar element 95 may include portions having partially different polarities. For example, the bipolar element 95 may include the first end having a first polarity and the second end having a second polarity. The first end and the second end may be both ends of the bipolar element 95 in the major axis direction. The orientation direction of the bipolar element 95 extending in a direction may be defined based on the direction in which the first end faces. The bipolar elements 95 flowing in the internal tube 330 and the nozzles 350 of the inkjet head 300 may not be oriented in a constant direction and may be dispersed in random directions. However, the disclosure is not limited thereto, and the bipolar elements 95 may flow in the internal tube 330 and the nozzle 350 while having a selected orientation direction.

Figure 9:
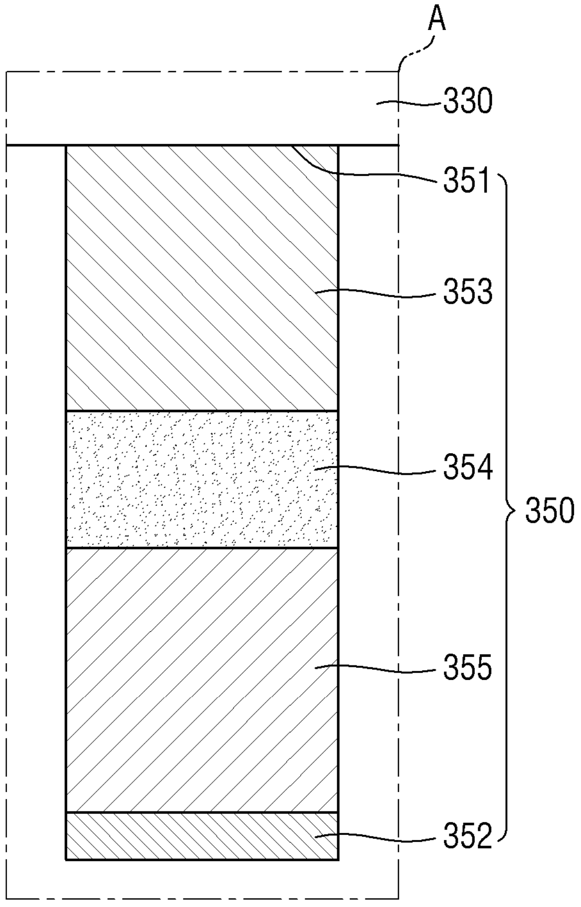
FIG. 9 is an enlarged schematic cross-sectional view of area A of FIG. 8.

FIG. 9 is an enlarged schematic cross-sectional view of area A of FIG. 8.

Referring to FIGS. 8 and 9, the nozzle 350 may include an inlet 351 connected to the internal tube 330 and an outlet 352 through which the ink 90 is discharged. The inlet 351 may be directly connected to the internal tube 330. The ink 90 may be directly discharged through the outlet 352.

The nozzle 350 may further include an actuator 353 disposed between the inlet 351 and the outlet 352. The actuator 353 may control the amount of droplets of the ink 90 discharged from the nozzle 350. The actuator 353 may be fixed to the internal tube 330.

The actuator 353 may apply a hydraulic pressure to the ink 90 introduced to the nozzle 350 to allow the ink 90 to be smoothly discharged through the nozzle 350.

According to an embodiment, the actuator 353 may control the amount of the ink 90 discharged through the nozzle 350. The actuator 353 may adjust the hydraulic pressure applied to the ink 90 and may control the amount of droplets of the ink 90 discharged to a unit space during the printing process of the inkjet printing apparatus 1000. For example, the amount of the ink 90 discharged once from the nozzle 350 may be in a range of about 1 to about 50 pL, and the discharge amount of the ink 90 that is necessary for a unit space in a single printing process may be about 50 pL or more. The actuator 353 may adjust the intensity or the frequency of the hydraulic pressure to control the amount of droplets of the ink 90 discharged from the nozzle 350 to be different in a single printing process.

The nozzle 350 may further include a flexible tube 354 disposed between the actuator 353 and the outlet 352. The flexible tube 354 may be bent when the nozzle 350 is deflected.

When the nozzle 350 is not deflected, the flexible tube 354 may extend in a thickness direction (third direction) as illustrated in FIG. 9 and when the nozzle 350 is deflected, the flexible tube 354 may be bent along one direction. As will be described later, the deflection of the nozzles 350 may be implemented through a microelectronic controller 355 configured in the nozzle 350. When the microelectronic controller 355 moves finely, the flexible tube 354 may be bent along the direction of the fine movement of the microelectronic controller 355. When the nozzle 350 is deflected, the flexible tube 354 may include a flexible material in order to be bent.

The nozzle 350 may further include the microelectronic controller 355 disposed between the flexible tube 354 and the outlet 352. As will be described later, the microelectronic controller 355 may be connected to at least one microelectronic control wire finely moving the microelectronic controller 355.

Figure 10:
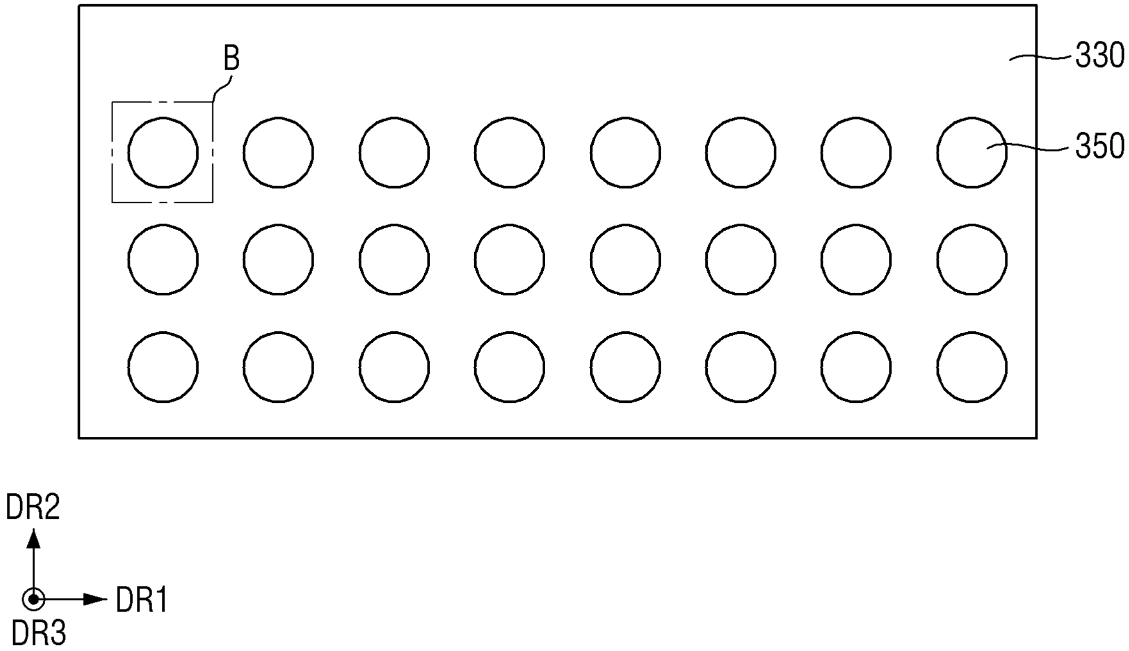
FIG. 10 is a schematic plan view illustrating the internal tube and the nozzle of FIG. 9.

FIG. 10 is a schematic plan view illustrating the internal tube and the nozzle of FIG. 9.

Referring to FIGS. 8 to 10, the planar shape of the internal tube 330 has been described with reference to FIG. 2 and the redundant descriptions will not be repeated. The nozzles 350 may be disposed in the internal tube 330 in a plan view. The nozzles 350 may be arranged along the first direction DR1. Although not illustrated in the drawing, the nozzles 350 may be arranged in a single row or multiple rows (arranged along the second direction DR2). Although the FIG. 8 illustrates eight nozzles 350 formed in the inkjet head 300, the disclosure is not limited thereto.

Figure 11:
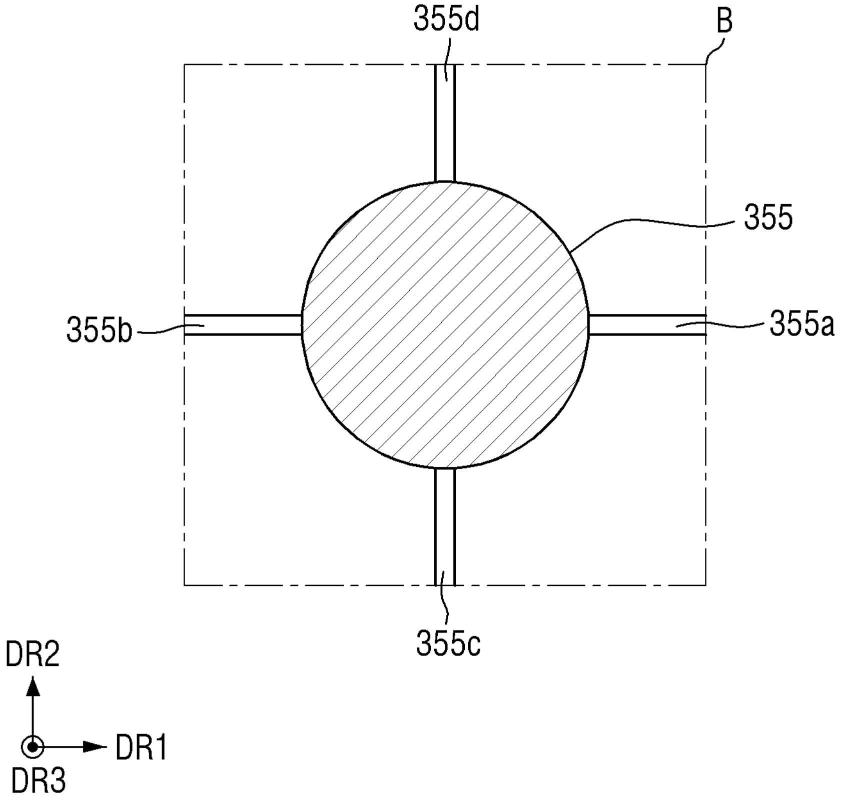
FIG. 11 is a schematic plan view illustrating the microelectronic controller of FIG. 9 and a microelectronic control wire connected to the microelectronic controller.

FIG. 11 is a schematic plan view illustrating the microelectronic controller of FIG. 9 and a microelectronic control wire connected (or attached) to the microelectronic controller.

Referring to FIG. 11, the microelectronic controller 355 may be connected (or attached) to a moving part finely moving the microelectronic controller 355. The moving part may be the microelectronic control wire, but the disclosure is not limited thereto. The moving part is not limited as long as a moving signal is inputted to the microelectronic controller 355, and the microelectronic controller 355 may finely move based on the moving signal input.

In an embodiment, a microelectronic controller 355 that is connected (or attached) to a moving part which finely moves the microelectronic controller 355. Accordingly, the microelectronic controller 355 may be connected (or attached) to at least one microelectronic control wire which finely moves the microelectronic controller 355. As illustrated in FIG. 11, the fine movement may be in the first direction DR1, the second direction DR2, or the first direction DR1 and the second direction DR2. In order for the microelectronic controller 355 to be finely moved by the microelectronic control wire in the first direction DR1, the second direction DR2, or the first direction DR1 and the second direction DR2, the at least one microelectronic control wire may include a first-direction microelectronic control wire extending along the first direction DR1 and a second-direction microelectronic control wire extending along the second direction DR2.

The first-direction microelectronic control wire may be connected (or attached) to a side (or an end) of the microelectronic controller 355 in the first direction DR1 or the other side (or the other end) of the microcontroller 355 in the first direction DR1. The second-direction microelectronic control wire may be connected (or attached) to a side of the microelectronic controller 355 in the second direction DR2 or the other side of the microelectronic controller 355 in the second direction DR2.

The first-direction microelectronic control wire may include a first microelectronic control wire 355*a* connected (or attached) to a side of the microelectronic controller 355 in the first direction DR1, and a second microelectronic control wire 355*b* connected (attached) to the other side of the microelectronic controller 355 in the first direction DR1.

The second-direction microelectronic control wire may include a third microelectronic control wire 355*d* connected (or attached) to a side of the microelectronic controller 355 in the second direction DR2, and a fourth microelectronic control wire 355*c* connected (or attached) to the other side of the microelectronic controller 355 in the second direction DR2.

Figure 12:
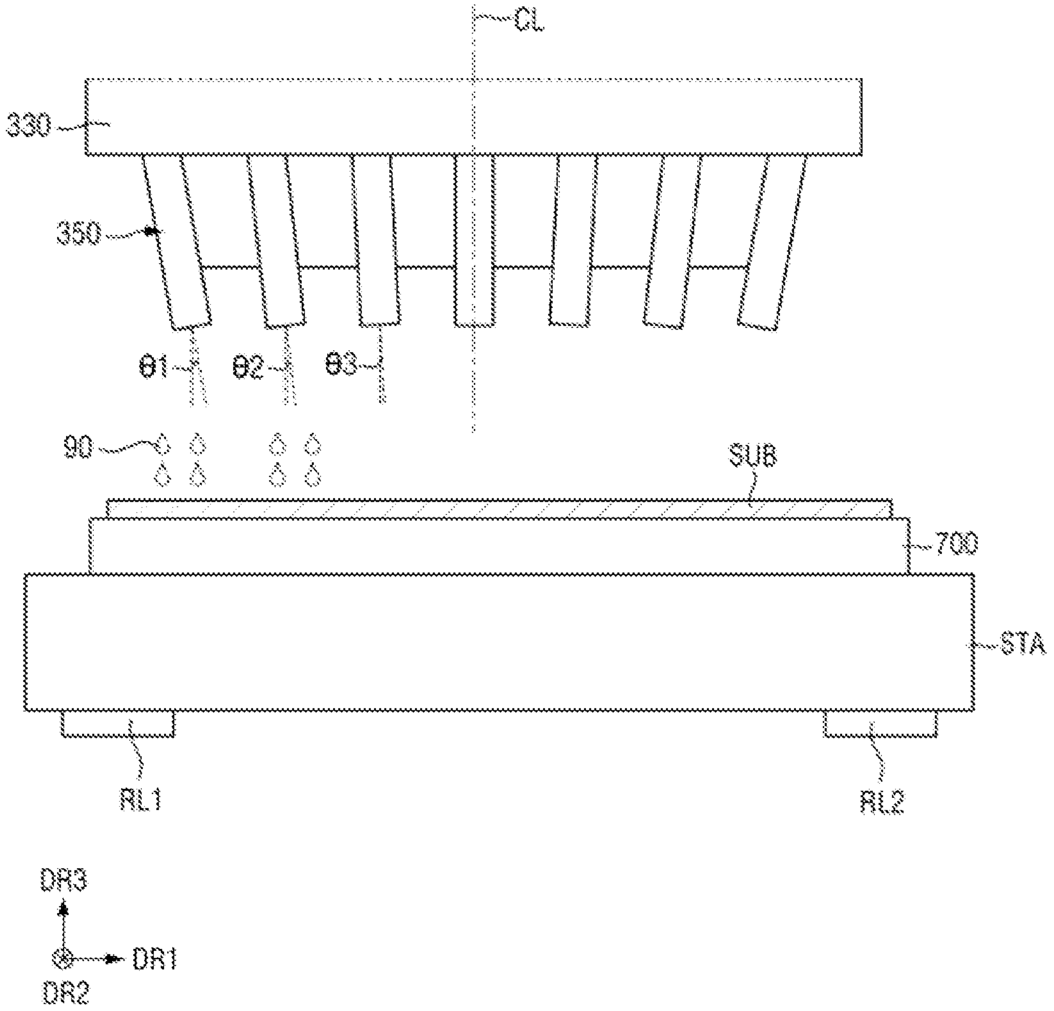
FIG. 12 is a schematic perspective view showing operations of a nozzles according to an embodiment.

FIG. 12 is a schematic perspective view showing operations of a nozzles according to an embodiment.

Figure 13:
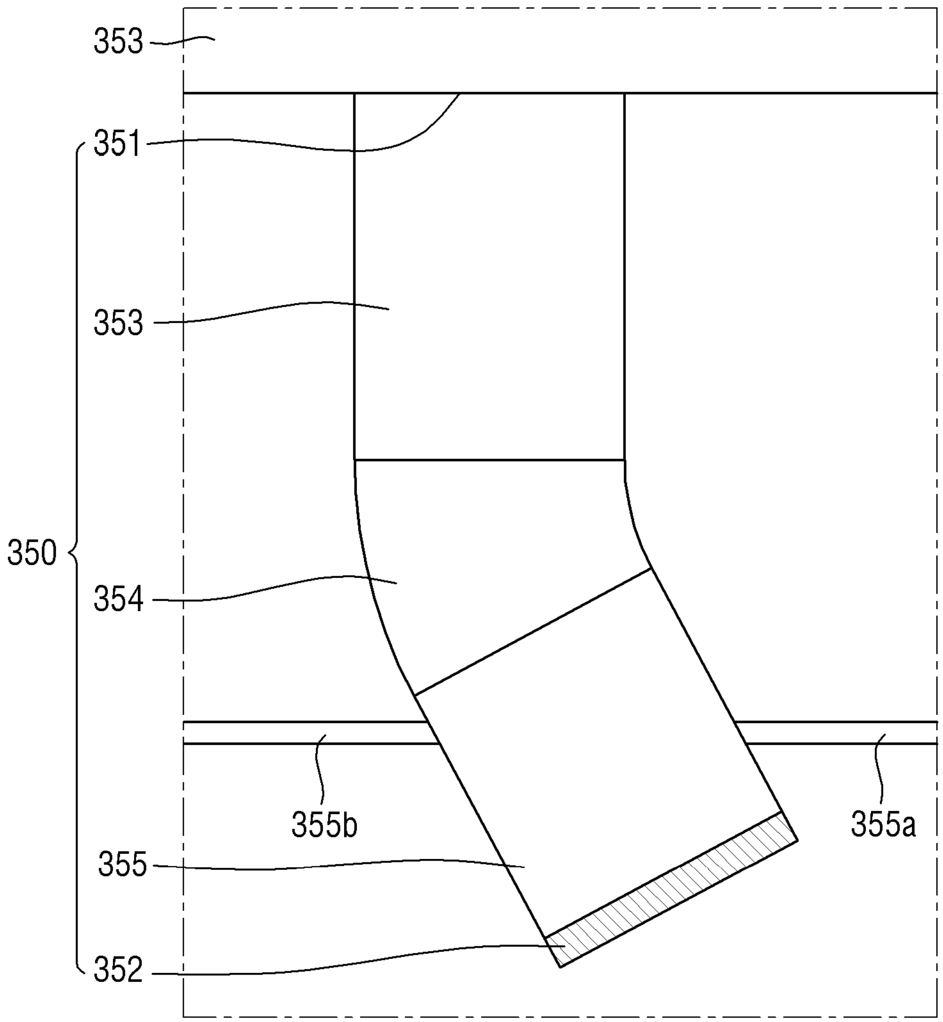
FIG. 13 is a schematic cross-sectional view of a case where a nozzle is deflected according to an embodiment.

FIG. 12 illustrates at least a part of the nozzles 350 being deflected in the first direction DR1. FIG. 13 is a schematic cross-sectional view of a case where a nozzle is deflected according to an embodiment.

As illustrated in FIGS. 9, 12 and 13, a bisector line CL extending in the third direction DR3 and dividing the nozzles 350 arranged in a single row is defined in FIG. 12.

At least a part of the nozzles 350 positioned at the other side of the bisector line CL in the first direction DR1 with respect to the bisector line CL may be seen as being deflected to one side thereof in the first direction DR1, and at least a part of the nozzles 350 positioned at one side of the bisector line CL in the first direction DR1 with respect to the bisector line CL may be seen as being deflected to the other side thereof in the first direction DR1. The nozzles 350 in a deflected state may have a second pitch. The second pitches between the deflected nozzles 350 may all be the same. The second pitch may be different from the first pitch P1 between the nozzles 350 in a non-deflected state. The second pitch may be smaller than the first pitch P1 between the nozzles 350 in a non-deflected state.

Discharge parts 352 of the nozzles 350 located on the other side of the bisector line CL in the first direction DR1 with respect to the bisector line CL may all be inclined toward the bisector line CL. Discharge parts 352 of the nozzles 350 located on one side of the bisector line CL in the first direction DR1 with respect to the bisector line CL may all be inclined toward the bisector line CL.

An angle between the extension direction of the lower ends of the flexible tubes 354 of the nozzles 350 located on the other side of the bisector line CL in the first direction DR1 with respect to the bisector line CL and the extension direction of the actuator 353 may become smaller as it becomes closer to the bisector CL (the angles may become smaller from $\theta 1 > \theta 2 > \theta 3$).

According to the embodiment, since each of the nozzles 350 further including the microelectronic controller 355 capable of moving along a selected direction is deflected along the selected direction, the pitch between the nozzles 350 which is fixed to the first pitch P1 in a non-deflected state may be easily or flexibly changed to a second pitch different from the first pitch P1, which is advantageous in terms of being able to easily adapt to a variable display resolution.

In some embodiments, as described with reference to FIG. 1, since the inkjet head 300 connected to the base frame 600 is movable vertically as the base frame 600 further includes the moving unit 630 movable vertically, a target pitch on the target substrate SUB may be adjusted by combining not only the deflection of the nozzles 350 by the microelectronic controller 355 but the vertical movement of the inkjet head 300.

In some other embodiments, the print head unit 100 connected to the bottom of the moving unit 630 may be made to be rotatable in the third direction DR3 as a rotation axis without being fixed by the fixing part 632. A rotation angle of the print head unit 100 in the third direction DR3 and the deflection of the nozzles 350 may be combined to adjust the target pitch on the target substrate SUB.

Although embodiments have been disclosed for illustrative purposes, those skilled in the art will appreciate that various modifications, additions, and substitutions are possible, without departing from the scope and spirit of the disclosure as disclosed in the accompanying claims.

What is claimed is:

1. An inkjet printing apparatus comprising:
an inkjet head disposed above a stage and including nozzles through which ink including bipolar elements is discharged, the bipolar elements each having regions partially doped with different polarities,
wherein at least part of the nozzles is deflected from a direction in case that the nozzles are in a deflected state.

2. The inkjet printing apparatus of claim 1, wherein
the inkjet head includes:
a base part; and
an internal tube disposed in the base part and supplied with the ink,
the nozzles are disposed at a lower end of the internal tube, and
the inkjet head causes the ink to flow through the internal tube and to be discharged through the nozzles.

3. The inkjet printing apparatus of claim 2, wherein each of the nozzles includes:
an inlet connected to the internal tube; and
an outlet through which the ink is discharged.

4. The inkjet printing apparatus of claim 3, wherein each of the nozzles further includes an actuator disposed between the inlet and the outlet.

5. The inkjet printing apparatus of claim 4, wherein the actuator controls an amount of droplets of the ink discharged from each of the nozzles.

6. The inkjet printing apparatus of claim 4, wherein the actuator is attached to the internal tube.

7. The inkjet printing apparatus of claim 6, wherein each of the nozzles further includes a flexible tube disposed between the actuator and the outlet.

8. The inkjet printing apparatus of claim 7, wherein each of the nozzles further includes a microelectronic controller disposed between the flexible tube and the outlet.

9. The inkjet printing apparatus of claim 8, wherein the microelectronic controller is connected to at least one microelectronic control wire attached to the microelectronic controller.

10. The inkjet printing apparatus of claim 9, wherein in case that the microelectronic controller moves, the flexible tube is bent in a movement direction in which the microelectronic controller moves.

11. The inkjet printing apparatus of claim 9, wherein
the at least one microelectronic control wire includes a plurality of microelectronic control wires, and
the plurality of microelectronic control wires include:
a first microelectronic control wire connected to an end of the microelectronic controller in a first direction; and
a second microelectronic control wire connected to another end of the microelectronic controller in the first direction.

12. The inkjet printing apparatus of claim 11, wherein the plurality of microelectronic control wires further include:
a third microelectronic control wire connected to an end of the microelectronic controller in a second direction intersecting the first direction; and
a fourth microelectronic control wire connected to another end of the microelectronic controller in the second direction.

13. An inkjet printing apparatus comprising:

a stage; and an inkjet head disposed above the stage and including nozzles through which ink including bipolar elements is discharged, each of the bipolar elements having regions partially doped with different polarities, wherein sprayed droplets of the ink have a first pitch in case that the nozzles are in a non-deflected state, and the sprayed droplets of the ink have a second pitch which is different from the first pitch in case that the nozzles are in a deflected state in which at least part of the nozzles are deflected from a direction.

14. The inkjet printing apparatus of claim 13, wherein the nozzles have the first pitch in the non-deflected state, and the nozzles have the second pitch in the deflected state.

15. The inkjet printing apparatus of claim 13, wherein the at least part of the nozzles includes a microelectronic controller that deflects the at least part of the nozzles from the direction.

16. The inkjet printing apparatus of claim 15, wherein the microelectronic controller is connected to at least one microelectronic control wire attached to the microelectronic controller.

17. The inkjet printing apparatus of claim 13, wherein the inkjet head is movable in a vertical direction.

18. The inkjet printing apparatus of claim 17, wherein the inkjet head is movable in the vertical direction to adjust a pitch on the stage between the ink discharged by the nozzles.

19. The inkjet printing apparatus of claim 13, wherein the inkjet head is capable of being tilted with respect to the stage, and the inkjet head is tilted to adjust a pitch on the stage between the ink discharged by the nozzles.

20. The inkjet printing apparatus of claim 13, wherein the inkjet head includes:

a base part; and an internal tube disposed in the base part and supplied with the ink;

the nozzles are disposed at a lower end of the internal tube, and the inkjet head causes the ink to flow through the internal tube and to be discharged through the nozzles.

* * * * *